Inventors
H. Schifflin
J. E. Dunn
by
Attorney

Patented Jan. 6, 1942

2,269,289

UNITED STATES PATENT OFFICE 2,269,289

NONBLINDING VIBRATING SCREEN

Herman Schifflin and John E. Dunn, Milwaukee, Wis., assignors to Allis-Chalmers Manufacturing Company, Milwaukee, Wis., a corporation of Delaware Application June 29, 1939, Serial No. 281,860

9 Claims. (Cl. 209—323)

This invention relates to vibrating screens used in separating different sizes of material and more especially to the screening of moist or sticky materials. In the screening of such material there is a tendency for the material to fill the screen openings until the screen may be partially or completely "blinded." This results in very poor screening efficiency.

Prior attempts have been made to eliminate screen blinding but all have met little or no success. Devices such as chains, blocks, etc. have been placed on top of the screen in order to stir up the material on the surface of the screen. Such attempts to prevent blinding did not solve the problem and served to interfere with the free flow of the material being screened. Objects placed on top of the screen were found to have a tendency to ride on top of the material rather than remain adjacent to the screen cloth, thereby materially reducing their effectiveness. Suction means operating below the screens have also been tried but have met with no material success.

The invention herein disclosed provides for a number of resilient bodies located below the screen cloth. The vibration of the screening mechanism causes the resilient bodies to impinge upon the screen and thereby loosen any sticky material tending to block the openings in the screen cloth.

It is an object of the invention to provide an improved means for preventing screen blinding when screening sticky materials.

Another object of the invention is to provide an improved means for preventing screen blinding which comprises a number of resilient bodies located below the screen cloth which will impinge upon the screen cloth and thereby free any material adhering thereto.

A further object of the invention is to provide an improved means for preventing screen blinding which will not retard the flow of material through or over the screen.

It is a further object of the invention to provide resilient balls, to be used in connection with a screen, of such number, shape and weight distribution as to most effectively prevent blinding in a screen.

It is a still further object of the invention to provide, for use with a vibrating screen, resilient balls of such shape as to promote movement thereof over an appreciable area of the screen, thereby removing adherent material from all parts of the screen.

It is a further object of the invention to provide asymmetric resilient bodies for use in vibrating screens.

Reference is made to the accompanying description and drawings, which illustrate specific embodiments of the invention in which.

Figure 1:
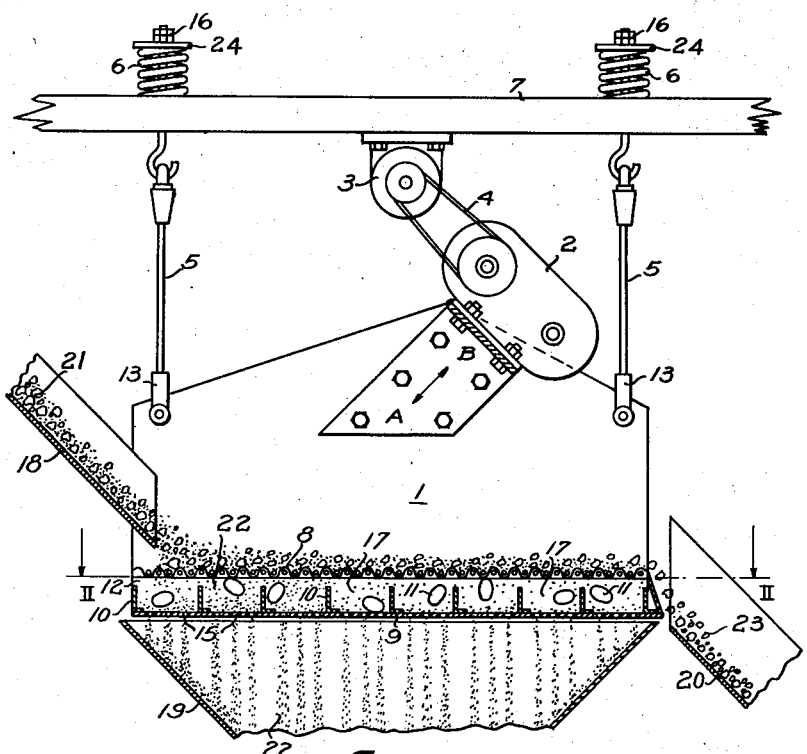
Fig. 1 is a sectional view in elevation showing a vibrating screen equipped with the improved screen cleaning means.
Figure 2:
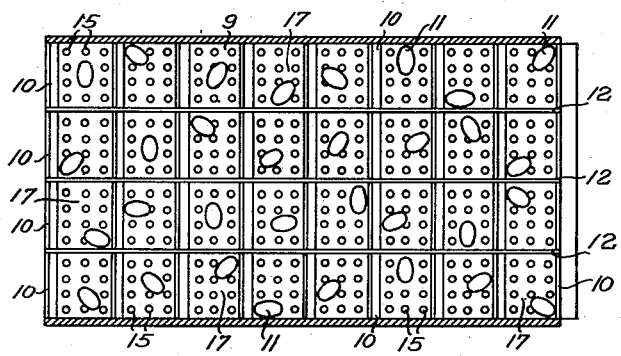
Fig. 2 illustrates a sectional plan view of Fig. 1 taken on the line II—II.

Figs. 1 and 2 illustrate a vibrating screen 1 which is actuated by a vibrating mechanism 2. The vibrating mechanism 2 is operated by an electric motor 3 through belts 4 and causes the screen 1 to vibrate in a path of movement indicated by arrows A, B. The screen 1 is suspended from a supporting structure 7 by a number of cables 5 which are attached to the screen 1 by means of clevises 13. To facilitate the vibration of the screen 1 and in order to transmit as little vibration as possible to the supporting structure 7, the wire cables 5 are supported by the structure 7 through springs 6. Retaining nuts 16 together with circular plates 24 connect the springs 6 with the wire cables 5.

Vibrating screen 1 is equipped with a screen cloth 8 of any desired mesh size, supported by longitudinal supporting bars 12. Below screen cloth 8 is located a subdeck 9 having perforations 15 of sufficient size to allow the fines to pass readily therethrough. The space between the screen cloth 8 and the subdeck 9 is divided into a number of rectangular compartments 17 by means of supporting bars 12 and a series of transverse angle irons 10. Within these compartments 17 are placed resilient balls 11 by means of which the screening surface 8 is kept free of blinding.

The material to be screened 21 is deposited on to screen cloth 8 by means of a chute 18. The vibration of the screen 1 causes the fines 22, to pass through the screen cloth 8 and on through the subdeck 9 into a receiving chute 19. Oversize 23 will travel along the screening surface 8 and off the end into a receiving chute 20. Should the material to be screened have a high percentage of moisture it may have a tendency to close the perforations in the screen cloth 8, thereby reducing the effectiveness of the screen. To eliminate this blinding effect, resilient balls 11 are placed in compartments 17. The vibration of the screen 1 causes the balls to rebound between the screen cloth 8 and the subdeck 9. The impact of balls 11 striking against the screening surface 8 will set up a secondary vibration in the screening surface 8 and will prevent any material from adhering thereto.

It has been found that the use of round balls in the compartments 17 is not entirely satisfactory. This is due to the fact that a round ball tends to bounce continuously at one spot on the screen adjacent the center of each compartment. This results in great wear at one point on the screen, inducing early screen breakage. Moreover, since the resilient ball does not cover the entire screen cloth surface in each compartment, it does not completely avoid blinding except at the point of impact at the center of the compartment.

In order to prevent the balls 11 from merely striking the screen cloth 8 at one point, the balls have been constructed of such shapes and combinations as to move about the compartment and prevent blinding at all points.

Figure 3:
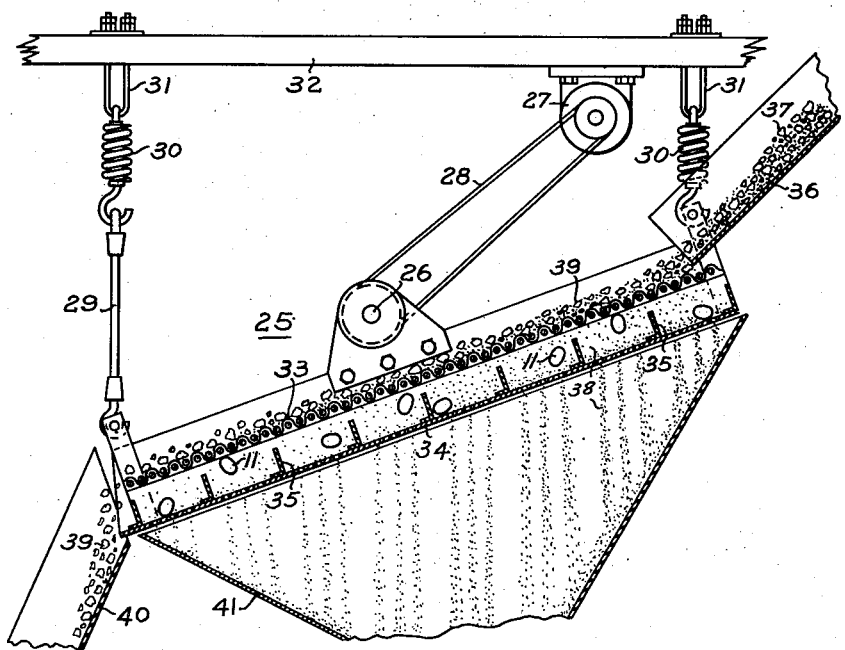
Fig. 3 illustrates a somewhat different vibrating screen equipped with the improved screen cleaning means.

Fig. 3 illustrates a somewhat different vibrating screen 25 equipped with the improved screen cleaner. The screen 25 is vibrated by means of an eccentrically weighted, rotating shaft 26 which is driven by a motor 27 through belts 28. The vibrating screen 25 is suspended from a supporting structure 32 by means of steel cables 29. The cables 29 are connected to the supporting structure by a U-bolt arrangement 31. Springs 30 are linked between the end of the cables 29 and the U-bolts 31 to allow for the vibration of the screen 25 without transmitting vibration to the supporting structure 32.

As indicated in Fig. 3 the vibrating screen 25 is suspended at an angle to the horizontal. The screen 25 is equipped with a screen cloth 33 having a subdeck 34 provided with perforations of a size and number to allow the screened material to pass readily into chute 41.

By means of longitudinal screen supporting bars combined with a series of transverse angle irons 35, the space between the screen cloth 33 and subdeck 34 is divided into a number of rectangular compartments. Resilient balls 11 are placed within the compartments thus formed.

The material 37 to be screened is conveyed onto screen cloth 33 by means of a chute 36. The fines 38 pass through the perforations in the subdeck 34 and on into the chute 41, while oversize 39 travels along the screening surface 33 and into chute 40. Again the action of the balls 11 will prevent the screening surface 33 from blinding.

Figures 4, 4A:
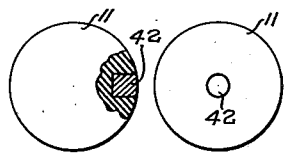
Figs. 4 to 11a illustrate various resilient bodies for use with vibrating screens.

Figs. 4 and 4a illustrate one type of resilient ball 11 having an off center weight 42 embodied in it. The resulting asymmetrical weight distribution prevents the ball from limiting its impacts to the center of its compartment. This type of ball tends to cover the entire area of the compartment, when the screen is in operation. In this manner the screen will be struck at many points, resulting in longer life for the screen cloth and in freedom from blinding for the entire area of the screen cloth.

Figures 5, 5A:
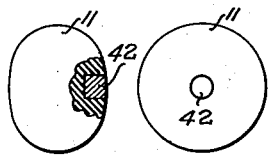

Figs. 5 and 5a illustrate a resilient ball 1 which is round in one plane and oval in a plane at 90° to the round plane. This ball also has an off-center weight 42. This ball has an action similar to the ball of Figs. 4 and 4a, but has the additional advantage that its oval shape helps to prevent the tendency to bounce on one spot on the screen cloth.

The resilient bodies of Figs. 4 and 5 are subject to the objection that the insertion of an off-center weight, such as metal slug 42, into a rubber ball is somewhat difficult, and the metal may possibly fall out after repeated impacts. To obviate these objections, other forms of asymmetric resilient bodies are provided.

Figures 6, 6A:
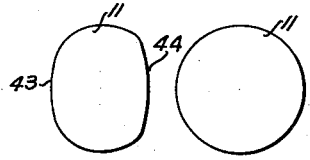

Figs. 6 and 6a show a generally round ball which is oval in one elevation, as shown in Fig. 6, with one surface 44 flatter than the opposing surface 43. This construction results in a body of irregular mass and contour, but without a metal slug incorporated therein. This type of body provides good area coverage in a vibrating screen.

Figures 7, 7A:
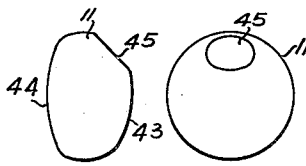

Figs. 7 and 7a illustrate a body similar to that shown in Figs. 6 and 6a, but being provided with an asymmetrically located flat spot 45 near an end thereof. This type of body has given extremely satisfactory service. Being completely asymmetrical, it has no tendency to bounce at one spot, but covers the entire area of the compartment in which it is located.

Figures 8, 8A:
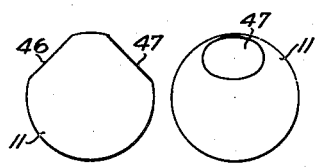
Figures 9, 9A:
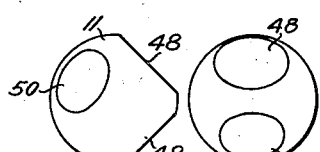

Figs. 8 and 8a illustrate a round ball 11 having flat spots 46 and 47 on its surface, while Figs. 9 and 9a illustrate a round ball 11 having three flat spots 48, 49 and 50 asymmetrically located on its surface. The eccentric location of the center of mass and the surface irregularities of these balls aid in covering more area on the screen cloth.

Figure 10:
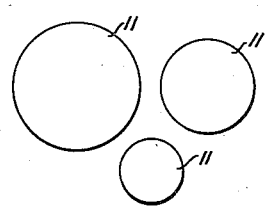

Fig. 10 illustrates a combination of round balls 11 of different sizes which may be placed in each compartment to prevent blinding. In this construction, since the balls of different sizes are given varying momentums by impact with the screen cloth and subdeck, they tend to have different and intersecting paths of movement, so that the larger ball, which does most of the effective screen cleaning, is urged to move around in its compartment by collision with the other balls.

Figures 11, 11A:
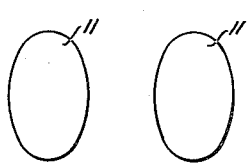

Fig. 11 illustrates a resilient oval or elliptical body for use in combination with a vibrating screen.

The above description illustrates various resilient bodies having desirable weight distribution, configuration or combination of bodies to produce the desired result. These are typical of many others which might be illustrated, and which will occur to those skilled in the art. The invention is therefore not limited to the specific constructions illustrated herein.

The resilient bodies illustrated herein are of globoid configuration, meaning that they are approximately globular and have no sharp projections or angles. The term "asymmetrical configuration" as used herein denotes that the body is so formed that it is not symmetrical about any axis passing through the body.

It is claimed and desired to secure by Letters Patent:

1. In a screening device, the combination with a frame having a screen, a foraminated deck carried by said frame below said screen, a plurality of compartments formed between said deck and said screen, resilient globoid bodies having asymmetrical weight distribution, located in at least some of said compartments for free movement therein, the major dimensions of said bodies being substantially smaller than the spacing between said screen and deck, and means for imparting to said frame a vibration of sufficient amplitude to cause said bodies to impact said screen.

2. A screening device having substantially plane screen cloth thereon and a deck located below said screen cloth and spaced therefrom, resilient globoid asymmetrically shaped bodies located between said screen cloth and said deck, the largest dimensions of said bodies being substantially less than the spacing between said deck and said screen cloth, said bodies being free to bound in all directions, and means for vibrating said screening device in a plane inclined to the plane of said screen cloth and at amplitudes sufficient to cause said bodies to impact said screen cloth.

3. In a screening device, the combination with a frame supporting a screen, a deck carried by said frame and located below said screen, and resilient globoid asymmetrically shaped bodies located between said screen cloth and said deck, the largest dimensions of said bodies being substantially less than the spacing between said screen and said deck, and means for imparting to said frame a vibration at amplitudes sufficient to cause said bodies to impact said screen, said vibration being in a plane inclined at an angle to the plane of said screen.

4. In a screening device, the combination with a frame having a screen and a foraminated deck carried by said frame and located below said screen, a plurality of compartments formed between said deck and said screen and a resilient globoid asymmetrically shaped body located in at least some of the said compartments, the largest dimensions of said bodies being substantially smaller than the space between said deck and said screen, and means for vibrating said frame in planes inclined to the plane of said screen and at amplitudes sufficient to cause said bodies to impact said screen.

5. A screening device as defined in claim 4, wherein said bodies are resilient asymmetrical ellipsoids.

6. A screening device as defined in claim 4, wherein said bodies are resilient ellipsoids provided with a flat surface on one or more portions thereof.

7. A vibrating screen body having a screen cloth, means for vibrating said screen body, resilient globoid asymmetrical bodies for producing a secondary vibration in said screen cloth, and means carried by said screen body for supporting said resilient bodies loosely near spaced parts of said screen cloth, whereby vibration of said screen body results in distributed impacts between said bodies and said screen cloth.

8. A vibrating screen body having a screen cloth, means for vibrating said screen body, ellipsoidal bodies each provided with one or more asymmetrically located flat surfaces for producing secondary vibration in said screen cloth, and means carried by said screen body for supporting said resilient bodies loosely in positions normally spaced from said screen cloth, whereby vibration of said screen body results in distributed impacts between said resilient bodies and said screen cloth.

9. In a screening device, the combination with a frame having a screen, means for imparting to said frame a vibration in a plane inclined to the plane of said screen, a foraminated deck located below said screen, a plurality of compartments formed between said deck and said screen and a resilient ball having an off-center weight therein located in at least some of said compartments for free movement therein, said off-center weight being of such magnitude and so disposed as to produce an asymmetrical weight distribution in said ball, the amplitude of vibration of said frame being sufficient to cause said balls to impact said screen.

HERMAN SCHIFFLIN.
JOHN E. DUNN.